US006352576B1

(12) United States Patent
Spencer et al.

(10) Patent No.: US 6,352,576 B1
(45) Date of Patent: Mar. 5, 2002

(54) METHODS OF SELECTIVELY SEPARATING $CO_2$ FROM A MULTICOMPONENT GASEOUS STREAM USING $CO_2$ HYDRATE PROMOTERS

(75) Inventors: Dwain F. Spencer, Half Moon Bay, CA (US); Robert P. Currier, Santa Fe, NM (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/538,704

(22) Filed: Mar. 30, 2000

(51) Int. Cl.$^7$ .............................................. B01D 53/78
(52) U.S. Cl. ...................... 95/236; 423/220; 423/437.1
(58) Field of Search ........................ 95/149, 236, 237, 95/153; 96/243; 423/220, 437.1; 62/53.1; 588/250; 585/15; 48/198.3, 127.3, 127.5, 197 FM

(56) References Cited

U.S. PATENT DOCUMENTS

| | | | |
|---|---|---|---|
| 3,150,942 A | | 9/1964 | Vasan |
| 3,359,744 A | | 12/1967 | Bolez et al. |
| 3,479,298 A | | 11/1969 | Sze et al. |
| 3,838,553 A | | 10/1974 | Doherty |
| 4,235,607 A | | 11/1980 | Kinder et al. |
| 4,821,794 A | * | 4/1989 | Tsai et al. ...................... 62/59 |
| 4,861,351 A | | 8/1989 | Nicholas et al. |
| 5,159,971 A | * | 11/1992 | Li ................................. 62/59 |
| 5,277,038 A | * | 1/1994 | Carr ............................ 62/434 |
| 5,364,611 A | * | 11/1994 | Iijima et al. .............. 423/437.1 |
| 5,397,553 A | | 3/1995 | Spencer |
| 5,434,330 A | | 7/1995 | Hnatow et al. |
| 5,536,893 A | * | 7/1996 | Gudmundsson .............. 585/15 |
| 5,562,891 A | * | 10/1996 | Spencer et al. .......... 423/437.1 |
| 5,600,044 A | | 2/1997 | Colle et al. |
| 5,700,311 A | * | 12/1997 | Spencer ....................... 95/236 |
| 5,958,844 A | * | 7/1999 | Sinquin et al. ............... 585/15 |
| 6,028,234 A | * | 2/2000 | Heinenmann et al. ........ 585/15 |

FOREIGN PATENT DOCUMENTS

JP 3-164419 7/1991

OTHER PUBLICATIONS

Austvick et al. (1992). "Deposition of $CO_2$ On the Seabed in the Form of Hydrates" *Energy Convers. Mgmt.*, vol. 33(5–8): 659–666.
Golomb et al. (1992). "The Fate of $CO_2$ Sequestered in the Deep Ocean" *Energy Convers. Mgmt.*, vol. 33(5–8): 675–683.
Nishikawa et al. (1992). "$CO_2$ Clathrate Formation and its Properties in the Simulated Deep Ocean" *Energy Convers. Mgmt.*, vol. 33(5–8): 651–657.
Saji et al. (1992). "Fixation of Carbon Dioxide by Clathrate–Hydrate" *Energy Convers. Mgmt.*, vol. 33(5–8): 643–649.
Spencer (1991). "A Preliminary Assessment of Carbon Dioxide Mitigation Options" *Annu. Rev. Energy Environ.*, vol. 16: 259–273.
Spencer et al. (1992). "Innovative $CO_2$ Separation and Sequestration Process for Treating Multicomponent Gas Streams" Freely Distributed by Authors Prior to Filing Date but After Apr. 28, 1997.

* cited by examiner

*Primary Examiner*—Duane Smith
*Assistant Examiner*—Jason M. Greene
(74) *Attorney, Agent, or Firm*—Bret E. Field; Bozicevic, Field & Francis

(57) ABSTRACT

Methods are provided for the selective removal of $CO_2$ from a multicomponent gaseous stream to provide a $CO_2$ depleted gaseous stream having at least a reduction, e.g. 30 to 90%, in the concentration of $CO_2$ relative to the untreated multicomponent gaseous stream. In practicing the subject methods, the multicomponent gaseous stream is contacted with an aqueous fluid, e.g. $CO_2$ nucleated water, under conditions of selective $CO_2$ clathrate formation to produce a $CO_2$ clathrate slurry and $CO_2$ depleted gaseous stream. A feature of the subject invention is that a $CO_2$ hydrate promoter is employed, where the $CO_2$ hydrate promoter is included in the multicomponent gaseous stream and/or the aqueous fluid. The $CO_2$ hydrate promoter serves to reduce the minimum $CO_2$ partial pressure required for hydrate formation as compared to a control. The subject methods find use in a variety of applications where it is desired to selectively remove $CO_2$ from a multicomponent gaseous stream.

19 Claims, No Drawings

METHODS OF SELECTIVELY SEPARATING $CO_2$ FROM A MULTICOMPONENT GASEOUS STREAM USING $CO_2$ HYDRATE PROMOTERS

FIELD OF THE INVENTION

The field of this invention is selective absorption of $CO_2$ gas.

INTRODUCTION

In many applications where mixtures of two or more gaseous components are present, it is often desirable to selectively remove one or more of the component gases from the gaseous stream. Of increasing interest in a variety of industrial applications, including power generation, chemical synthesis, natural gas upgrading, and conversion of methane hydrates to hydrogen and $CO_2$, is the selective removal of $CO_2$ from multicomponent gaseous streams.

An example of where selective $CO_2$ removal from a multicomponent gaseous stream is desirable is the processing of synthesis gas or syngas. Syngas is a mixture of hydrogen, carbon monoxide and $CO_2$ that is readily produced from fossil fuels and finds use both as a fuel and as a chemical feedstock. In many applications involving syngas, the carbon monoxide is converted to hydrogen and additional $CO_2$ via the water-gas shift process. It is then often desirable to separate the $CO_2$ from the hydrogen to obtain a pure $H_2$ stream for subsequent use, e.g. as a fuel or feedstock.

As man made $CO_2$ is increasingly viewed as a pollutant, another area in which it is desirable to separate $CO_2$ from a multicomponent gaseous stream is in the area of pollution control. Emissions from industrial facilities, such as manufacturing and power generation facilities, often include $CO_2$. In such instances, it is often desirable to at least reduce the $CO_2$ concentration of the emissions. The $CO_2$ may be removed prior to combustion in some cases and post combustion in others.

A variety of processes have been developed for removing or isolating a particular gaseous component from a multicomponent gaseous stream. These processes include cryogenic fractionation, selective adsorption by solid adsorbents, gas absorption, and the like. In gas absorption processes, solute gases are separated from gaseous mixtures by transport into a liquid solvent. In such processes, the liquid solvent ideally offers specific or selective solubility for the solute gas or gases to be separated.

Gas absorption finds widespread use in the separation of $CO_2$ from multicomponent gaseous streams. In $CO_2$ gas absorption processes that currently find use, the following steps are employed: (1) absorption of $CO_2$ from the gaseous stream by a host solvent, e.g. monoethanolamine; (2) removal of $CO_2$ from the host solvent, e.g. by steam stripping; and (3) compression of the stripped $CO_2$ for disposal, e.g. by sequestration through deposition in the deep ocean or ground aquifers.

Although these processes have proved successful for the selective removal of $CO_2$ from a multicomponent gaseous stream, they are energy intensive. For example, using the above processes employing monoethanolamine as the selective absorbent solvent to remove $CO_2$ from effluent flue gas generated by a power plant often requires 25 to 30% of the available energy generated by the plant. In most situations, this energy requirement, as well as the additional cost for removing the $CO_2$ from the flue gas, is prohibitive.

Accordingly, there is continued interest in the development of less energy intensive processes for the selective removal of $CO_2$ from multicomponent gaseous streams. Ideally, alternative $CO_2$ removal processes should be simple, require inexpensive materials and low energy inputs, and be low in cost for separation and sequestration of the $CO_2$. Of particular interest would be the development of a process which provided for efficient $CO_2$ separation at low temperature (e.g. 0 to 10° C.) from low $CO_2$ partial pressure multicomponent gaseous streams.

Relevant Literature

Patents disclosing methods of selectively removing one or more components from a multicomponent gaseous stream include: U.S. Pat. Nos. 3,150,942; 3,359,744; 3,479,298; 3,838,553; 4,253,607; 4,861,351; 5,397,553; 5,434,330; 5,562,891; 5,600,044 and 5,700,311.

Other publications discussing $CO_2$ clathrate formation include Japanese unexamined patent application 3-164419; Austvik & Loken, "Deposition of $CO_2$ on the Seabed in the Form of Clathrates, " Energy Convers. Mgmt. (1992) 33: 659–666; Golumb et al., "The Fate of $CO_2$ Sequestered in the Deep Ocean," Energy Convers. Mgmt. (1992) 33: 675–683; Morgan et al., "Hydrate Formation from Gaseous $CO_2$ and water," Environmental Science and Technology (1999) 33: 1448–1452; Nishikawa et al., "$CO_2$ Clathrate Formation and its Properties in the Simulated Deep Ocean," Energy Convers. Mgmt. (1992) 33:651–657; Saji et al., "Fixation of Carbon Dioxide by Clathrate-Hyrdrate," Energy Convers. Mgmt. (1992) 33: 643–649; Spencer, "A preliminary Assessment of Carbon Dioxide Mitigation Options," Annu. Rev. Energy Energy Environ. (1991) 16: 259–273; Spencer & North, "Ocean Systems for Managing the Global Carbon Cycle," Energy Convers. Mgmt. (1997) 38 Suppl.: 265–272; and Spencer & White, "Sequestration Processes for Treating Multicomponent Gas Streams," Proceedings of $23^{rd}$ Coal and Fuel Systems Conference, Clearwater, Fla. (March 1998).

SUMMARY OF THE INVENTION

Methods are provided for the selective removal of $CO_2$ from a multicomponent gaseous stream to provide a $CO_2$ depleted gaseous stream having at least a reduction, e.g. 20%, in the concentration of $CO_2$ relative to the untreated multicomponent gaseous stream. In practicing the subject methods, the multicomponent gaseous stream is contacted with an aqueous fluid, e.g. $CO_2$ nucleated (or structured) water, under conditions of selective $CO_2$ clathrate formation to produce a $CO_2$ clathrate slurry and $CO_2$ depleted gaseous stream. A feature of the subject invention is that a $CO_2$ hydrate promoter is employed, where the $CO_2$ hydrate promoter is included in the multicomponent gaseous stream and/or the aqueous fluid. The $CO_2$ hydrate promoter serves to reduce the minimum $CO_2$ partial pressure required for formation of $CO_2$ containing hydrates (i.e. $CO_2$ hydrates) as compared to a control using pure $CO_2$ gas and water. The subject methods find use in a variety of applications where it is desired to selectively remove $CO_2$ from a multicomponent gaseous stream.

DETAILED DESCRIPTION OF THE INVENTION

Methods are provided for the selective removal of $CO_2$ from a multicomponent gaseous stream to provide a $CO_2$ depleted gaseous stream having at least a reduction, e.g. 30 to 90%, in the concentration of $CO_2$ relative to the untreated multicomponent gaseous stream. In practicing the subject methods, the multicomponent gaseous stream is contacted with an aqueous fluid, e.g. $CO_2$ nucleated (or structure) water, under conditions of selective $CO_2$ clathrate formation to produce a $CO_2$ clathrate slurry and $CO_2$ depleted gaseous stream. A feature of the subject invention is that a $CO_2$ hydrate promoter is employed, where the $CO_2$ hydrate promoter is included in the multicomponent gaseous stream and/or the aqueous fluid. The $CO_2$ hydrate promoter serves to reduce the minimum $CO_2$ partial pressure required for formation of $CO_2$ containing hydrates as compared to a control using pure $CO_2$ and water. The subject methods find use in a variety of applications where it is desired to selectively remove $CO_2$ from a multicomponent gaseous stream.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

As summarized above, the subject invention provides a method of selectively removing $CO_2$ from multicomponent gaseous stream, where a feature of the subject methods is the use of a $CO_2$ hydrate promoter. As mentioned above, the $CO_2$ hydrate promoter may be present in the multicomponent gaseous stream and/or in $CO_2$ nucleated or non-nucleated water (hydrate precursor solution).

In the subject methods, the first step is to provide a multicomponent gaseous stream that includes a $CO_2$ hydrate promoter and/or an aqueous fluid, e.g. $CO_2$ nucleated or non-nucleated water (water source), that includes a $CO_2$ hydrate promoter. Specifically, a multicomponent gaseous stream and/or $CO_2$ nucleated water source is provided that includes an amount of a $CO_2$ hydrate promoter that is sufficient to reduce the $CO_2$ partial pressure requirement of hydrate formation under a given set of conditions, e.g. at or near 0° C., as compared to a control. By $CO_2$ partial pressure requirement of hydrate formation is meant the $CO_2$ partial pressure in the multicomponent gaseous stream that is required for $CO_2$ hydrate formation to occur upon contact with an aqueous fluid under a given set of conditions, such as the ones described in greater detail, infra. The amount of $CO_2$ hydrate promoter that is present in the multicomponent gaseous stream and/or $CO_2$ nucleated water is generally sufficient to provide for a reduction in the $CO_2$ partial pressure requirement of hydrate formation of at least about 20%, usually at least about 30% and more usually at least about 60% as compared to a control (i.e. the $CO_2$ partial pressure requirement of hydrate formation in the absence of the $CO_2$ hydrate promoter under otherwise identical conditions), where in certain embodiments the magnitude of the reduction may be as great as 85, 90 or 95% or more. For example, the $CO_2$ partial pressure requirement at 0° C. in the presence of a sufficient amount of $CO_2$ hydrate promoter is less than about 9 atm, usually less than about 5 atm and may be as low as 2 atm or 1 atm or lower.

The specific amount of gaseous $CO_2$ hydrate promoter that is present in the provided multicomponent gaseous stream of this first step depends, in large part, on the nature of the multicomponent gaseous stream, the nature of the $CO_2$ hydrate promoter, and the like, where representative amounts for different types of representative multicomponent gaseous streams are provided infra. Generally, the amount of $CO_2$ hydrate promoter that is present, initially, in the multicomponent gaseous stream ranges from about 1 to 5 mole percent, usually from about 1.5 to 4 mole percent and more usually from about 2 to 3 mole percent.

The specific amount of liquid $CO_2$ hydrate promoter, dissolved in the $CO_2$ nucleated water (hydrate precursor solution) depends, in large part, on the nature of the specific dissolved liquid or solid in the nucleated water stream, the nature of the $CO_2$ hydrate promoters, and the like, where representative amounts for different types of representative dissolved liquid or solid hydrate promoters are provide infra. Generally, the amount of dissolved $CO_2$ promoter that is present in the nucleated water stream ranges from about 10 ppm to 10,000 ppm, usually from about 100 ppm to 2000 ppm and more usually from about 150 ppm to 1500 ppm.

Any convenient gaseous $CO_2$ hydrate promoter that is capable of providing the above described reduction in $CO_2$ partial pressure requirement of hydrate formation when present in the multicomponent gaseous stream may be employed. Generally, suitable $CO_2$ hydrate promoters are low molecular weight compounds that have low vapor pressures at their hydrate formation pressure. By low vapor pressure is meant a vapor pressure ranging from about 0.1 to 1 atm, usually from about 0.2 to 0.95 atm and more usually from about 0.25 to 0.92 atm. By low molecular weight is meant a molecular weight that does not exceed about 350 daltons, usually does not exceed about 100 daltons and more usually does not exceed about 75 daltons.

One type of gaseous $CO_2$ hydrate promoter is a sulfur containing compound, where specific sulfur containing compounds of interest include: $H_2S$, $SO_2$, $CS_2$ and the like. Where the $CO_2$ hydrate promoter is $H_2S$, it is generally present in the multicomponent gaseous stream in an amount ranging from about 1.0 to 5.0 mole percent, usually from about 1.5 to 4.0 mole percent and more usually from about 2.0 to 3.0 mole percent. Where the $CO_2$ hydrate promoter is $SO_2$, it is generally present in the multicomponent gaseous stream in an amount ranging from about 1.0 to 5.0 mole percent, usually from about 1.5 to 4.0 mole percent and more usually from about 2.0 to 3.0 mole percent.

Also of particular interest as $CO_2$ hydrate promoters are proton donors, such as water soluble halogenated hydrocarbons, amines and the like. Water soluble halogenated hydrocarbons of interest are generally those having from 1 to 5, usually 1 to 4 and more usually 1 to 2 carbon atoms, where the halogen moiety may be F, Cl, Br, I etc. Specific halogenated hydrocarbons of interest include chloroform, ethylene chloride, carbon tetrachloride, and the like. Where the $CO_2$ hydrate promoter is ethylene chloride, it is generally dissolved in the nucleated water in an amount ranging from about 100 to 2500 ppm, usually from about 500 to 2000 ppm and more usually from about 1000 to 1800 ppm. Where the $CO_2$ hydrate promoter is chloroform, it is generally present in the nucleated water in an amount ranging from about 100 to 2500 ppm, usually from about 500 to 2000 ppm and more usually from about 1000 to 1800 ppm. Where the $CO_2$ hydrate promoter is carbon tetrachloride, it is generally present in the nucleated water in an amount ranging from about 50 to 200 ppm, usually from about 80 to 160 ppm and more usually from about 100 to 120 ppm. In addition, if amines such as diethanolamine, are utilized as a $CO_2$ hydrate promoter, there is even greater flexibility in determining the ideal amount of amine, since the amine is essentially infinitely soluble in water. However, if diethanolamine is utilized, it is generally present in the nucleated water stream in an amount ranging from about 1000 to 5000 ppm, usually from about 500 to 3000 ppm and more usually from about 1000 to 3000 ppm.

Also of particular interest as $CO_2$ promoters are the organic salts, particularly alkyl ammonium, sulfonium and phosphonium salts. The alkyl ammonium salts are compounds with cations of the generic formula:

$$R_4N+$$

where R usually consists of hydrocarbon elements of the formula:

$$nC_aH_{2a+}, n=1,2,3 \ldots a=1,2,3$$

For example, R may be methyl or normal (linear) $C_4H_9$, but may also be iso-$C_3H_{11}$. Of the four groups attached to the nitrogen, they need not all be of the same chemical composition (i.e. one may be methyl while another may be ethyl etc.). The anionic portion of the salt may consist of simple ions such as: F—, HCOO—, OH—, Br—, Cl—, $NO_3$—, etc, but may also be ions such as normal (linear):

$$nC_aH_{2a+}COO- \text{ or iso-}nC_aH_{2a+}COO-.$$

The sulfonium salts usually are compounds with cations of the generic formula:

$$R_3S+$$

where again R may be any of the possibilities cited above. Similarly, for the sulfonium salts, all three R's need not be of the same chemical composition. The anion for the sulfonium salts is usually F—. The phosphonium salts generally have the generic formula:

$$R_4P+$$

for the cations with the same choices for the four R groups as described above. The anions may be anions as described above.

This class of akyl-onium salts readily form hydrate structures involving encagement of the salt in the same class of polyhedral water cages as seen in the simple gas hydrates. (In many cases the anion actually is part of the cage structure.) The hydrates of these salts form at atmospheric pressure and are stable well above the freezing point of water (where some melting points exceed 20° C.).

The above described "onium" salts vary widely in the number of water molecules per salt molecule (i.e. the hydration number). For example, the hydration number may be as low as 4 (for hydroxide salts) and as high as 50 (for formate salts), but will typically range from about 18 to 38 (e.g. for flouride and oxalate salts).

The concentration to be used depends on which embodiment of the invention is employed. When used as a means for nucleating water, concentrations are similar to the gaseous promoters, usually in the range of 100 to 150 ppm. However, when used to form mixed hydrates, the promoter salt concentration may be substantially higher depending on the final partial pressure of $CO_2$ that is sought. For the "onium" salts, this could be as high as 30 wt. percent, but is more typically in the range of from 5 to 25% by wt.

When used to alter the solubility of charged gases, the promoter structure away from the charged end is chosen to be chemically similar to the gaseous component whose solubility is to be decreased and chosen to have an affinity for gas molecules whose solubility is to be increased. Since alteration of gaseous solubility would typically be used in conjunction with the other embodiments (e.g. formation of mixed hydrates, raising of T, or lowering of P) the concentrations could be as high as 30 wt. %, but typically would be about 5 to 25 wt. %.

The above organic or onium salts find particular use as hydrate promoters in the following applications: (1) as a means of nucleating water so that $CO_2$ hydrates from for readily; (2) as a means of forming mixed hydrates of $CO_2$ and the alkyl-onium salts, where the mixed hydrates may consist predominantly of salt guest molecules and are useful in the final step to bring the $CO_2$ partial pressure down to below 1 atm; (3) as a means of raising the temperature at which $CO_2$ hydrates or mixed $CO_2$-alkyl-onium salt hydrates will form; (4) as a means to lower the partial pressure of $CO_2$ required for formation of the $CO_2$ containing hydrates; (b) as a means to alter the solubility of gases in the process water.

The R-groups on the cations are typically chosen so as to lower the solubility of compounds where incorporation into the $CO_2$ or mixed hydrate is undesirable. For example, R's may be chosen as hydrocarbon moieties which lower the solubility of methane in water for natural gas upgrading gas applications. In certain embodiments, the R groups are chosen so that solubility of gases, whose incorporation into the hydrate is desirable, is increased. An example would be R groups with a mild chemical affinity for the solvated gas of interest, e.g. $CO_2$.

In certain embodiments of the invention, the nucleated water further includes a freezing point depression agent or "anti-freeze" agent. Frezing point depression agents that may be included in the nucleated water are glycerol, ethylene glycol, and the like. The amount of freezing point depressing agent that is included is generally sufficient to reduce the freezing point of the nucleated water by at least about 5, usually by at least about 10 and up to 20° C. or more. As such, the amount of freezing point depressing agent in the nucleated water typically ranges from about 20 to 30% by volume.

The multicomponent gaseous stream may be provided in the first step of the subject invention using any convenient protocol. In certain embodiments, a multicomponent gaseous stream of interest will merely be tested to ensure that it includes the requisite amount of $CO_2$ hydrate promoter of interest. Generally, however, this step requires adding a sufficient amount of the $CO_2$ hydrate promoter to the multicomponent gaseous stream to be treated. The requisite amount of $CO_2$ hydrate promoter that needs to be added to a given multicomponent gaseous stream of interest necessarily varies depending on the nature of the gaseous stream, the nature of the $CO_2$ hydrate promoter, the desired $CO_2$ separation ratio and the like. The requisite amount of $CO_2$ hydrate promoter may be added to the multicomponent gaseous stream using any convenient protocol, e.g. by combining gaseous streams, recycling gaseous compounds, adding appropriate gaseous components, etc.

Following provision of the multicomponent gaseous stream that includes the requisite amount of $CO_2$ hydrate promoter (when desired), the next step in the subject methods is to contact the multicomponent gaseous stream with an aqueous fluid under conditions sufficient for $CO_2$ hydrate formation to occur. Any convenient aqueous fluid may be employed, where aqueous fluids of interest include water, either pure water or salt water, $CO_2$ nucleated water as described in U.S. Pat. No. 5,700,311 and U.S. patent application Ser. Nos. 09/067,937, now U.S. Pat. No. 6,090,186 and 09/330,251, now U.S. Pat. No. 6,106,595; the disclosures of which are herein incorporated by reference, and the like. As discussed above, the aqueous fluid may include a $CO_2$ hydrate promoter in certain embodiments. Aqueous fluids such as nucleated water containing a $CO_2$ hydrate promoter may be prepared using any convenient protocol, e.g. by introducing an appropriate amount of the liquid $CO_2$ hydrate promoter to the aqueous fluid.

In many embodiments, the multicomponent gaseous stream to be treated according to the subject methods is contacted with water which may contain $CO_2$ hydrate precursors or hydrate precursors of the promoter compounds. The nucleated water may or may not include a $CO_2$ hydrate promoter, as described above. The $CO_2$ nucleated water employed in these embodiments of the subject invention comprises dissolved $CO_2$ in the form of $CO_2$ hydrate precursors, where the precursors are in metastable form. These precursors may be composite for mixed hydrates containing both $CO_2$ and promoter molecules The mole fraction of $CO_2$ in the $CO_2$ nucleated water ranges from about 0.01 to 0.10, usually from about 0.02 to 0.08, more usually from about 0.04 to 0.06. The temperature of the $CO_2$ nucleated water typically ranges from about −1.5 to 10° C., preferably from about 0 to 5° C., and more preferably from about 0.5 to 3.0° C. In those embodiments in which an antifreeze is employed, the temperature often ranges from about −20 to −5° C.

$CO_2$ nucleated water employed in the subject methods as the selective liquid absorbent or adsorbent may be prepared using any convenient means. One convenient means of obtaining $CO_2$ nucleated water is described in U.S. Application Ser. No. 08/291,593, filed Aug. 16, 1994, now U.S. Pat. No. 5,562,891, the disclosure of which is herein incorporated by reference. In this method $CO_2$ is first dissolved in water using any convenient means, e.g. bubbling a stream of $CO_2$ gas through the water, injection of $CO_2$ into the water under conditions of sufficient mixing or agitation to provide for homogeneous dispersion of the $CO_2$ throughout the water, and the like, where the $CO_2$ source that is combined with the water in this first stage may be either in liquid or gaseous phase. Mere gaseous $CO_2$ is combined with water to make the $CO_2$ nucleated water, the gaseous $CO_2$ will typically be pressurized, usually to partial pressures ranging between 6 to 50 atm, more usually between about 10 to 20 atm. The $CO_2$ may be derived from any convenient source. In a preferred embodiment, at least a portion of the $CO_2$ is gaseous $CO_2$ obtained from a $CO_2$ hydrate slurry decomposition step, as described in greater detail below. The water in which the $CO_2$ is dissolved may be fresh water or salt water, e.g. sea water, or may contain $CO_2$ hydrate promoters. The temperature of the $CO_2$ nucleated water typically ranges from about −1.5 to 10° C., preferably from about 0 to 5° C., and more preferably from about 0.5 to 3.0° C. In those embodiments in which an antifreeze is employed, the temperature often ranges from about −20 to −5° C.

The water that is used to produce the nucleated water may be obtained from any convenient source, where convenient sources include the deep ocean, deep fresh water aquifers, powerplant cooling ponds, and the like, and cooled to the required reactor conditions. In certain embodiments, the nucleated water may be recycled from a downstream source, such a clathrate slurry heat exchanger/decomposition source (as described in greater detail below) where such recycled nucleated water may be supplemented as necessary with additional water, which water may or may not be newly synthesized nucleated water as described above and may, or may not, contain dissolved $CO_2$ hydrate promoters.

The amount of $CO_2$ which is dissolved in the water is determined in view of the desired $CO_2$ mole fraction of the $CO_2$ nucleated water to be contacted with the gaseous stream. One means of obtaining $CO_2$ nucleated water having relatively high mole fractions of $CO_2$ is to produce a slurry of $CO_2$ clathrates and then decompose the clathrates by lowering the pressure and/or raising the temperature of the slurry to release $CO_2$ and regenerate a partially nucleated water stream. Generally, nucleated water having higher mole fractions of $CO_2$ are desired because it more readily accepts $CO_2$ absorption or adsorption and limits formation of other hydrate compounds. By high mole fraction of $CO_2$ is meant a mole fraction of about 0.05 to 0.09, usually from about 0.06 to 0.08.

The production of $CO_2$ nucleated water may conveniently be carried out in a nucleation reactor. The reactor may be packed with a variety of materials, where particular materials of interest are those which promote the formation of $CO_2$ nucleated water with hydrate precursors and include: stainless steel rings, carbon steel rings, metal oxides and the like, to promote gas-liquid contact and catalyze hydrate formation. To ensure that the optimal temperature is maintained in the nucleation reactor, active coolant means may be employed. Any convenient coolant means may be used, where the coolant means will typically comprise a coolant medium housed in a container which contacts the reactor, preferably with a large surface area of contact, such as coils around and/or within the reactor or at least a portion thereof, such as the tail tube of the reactor. Coolant materials or media of interest include liquid ammonia, HCFCs, and the like, where a particular coolant material of interest is ammonia, where the ammonia is evaporated at a temperature of from about −10 to −5° C. The surface of the cooling coils, or a portion thereof, may be coated with a catalyst material, such as an oxide of aluminum, iron, chromium, titanium, and the like, to accelerate $CO_2$ hydrate precursor formation. Additionally, hydrate crystal seeding or a small (1–3 atm) pressure swing may be utilized to enhance hydrate precursor formation.

In a preferred embodiment of the subject invention, the $CO_2$ nucleated water is prepared by contacting water (e.g. fresh or salt water) with high pressure, substantially pure $CO_2$ gas provided from an external high pressure $CO_2$ gas source. In this embodiment, the water is contacted with substantially pure $CO_2$ gas which is at a pressure that is about equal to or slightly above the total multicomponent gaseous stream pressure. As such, the pressure of the substantially pure $CO_2$ gas typically ranges in many embodiments from about 5 to 7 atm above the multicomponent gaseous stream pressure, and may be 15 to 80, usually 20 to 70 and more usually 25 to 60 atm above the $CO_2$ partial pressure of the multicomponent gaseous stream ($CO_2$ overpressure stimulation of hydrate precursor and hydrate formation). By substantially pure is meant that the $CO_2$ gas is at least 95% pure, usually at least 99% pure and more usually at least 99.9% pure. Advantages realized in this preferred embodiment include the production of $CO_2$ saturated water that comprises high amounts of dissolved $CO_2$, e.g. amounts (mole fractions) ranging from about 0.02 to 0.10, usually from about 0.04 to 0.08. Additional advantages include the use of relatively smaller nucleation reactors (as compared to nucleation reactors employed in other embodiments of the subject invention) and the production of more $CO_2$ selective nucleated water. In those embodiments where small nucleation reactors are employed, it may be desirable to batch produce the $CO_2$ saturated water, e.g. by producing the total requisite amount of $CO_2$ saturated water in portions and storing the saturated water in a high pressure reservoir. The $CO_2$ saturated water is readily converted to nucleated water, i.e. water laden with $CO_2$ hydrate precursors, using any convenient means, e.g. by temperature cycling, contact with catalysts, pressure cycling, etc. This prestructuring of the hydrate formation water not only increases the kinetics of hydrate formation, but also reduces the exothermic energy release in the $CO_2$ hydrate reactor. This, in turn, reduces the cooling demands of the process and increases overall process efficiency.

As mentioned above, in this step of the subject methods, the multicomponent gaseous stream with or without hydrate promoters is contacted with the aqueous fluid, e.g. $CO_2$ nucleated water with or without hydrate promoters, under conditions of $CO_2$ clathrate formation, preferably under conditions of selective $CO_2$ clathrate formation. The aqueous fluid may be contacted with the gaseous stream using any convenient means. Preferred means of contacting the aqueous fluid with the gaseous stream are those means that provide for efficient removal, e.g. by absorption or adsorption which enhances hydrate formation, of the $CO_2$ from the gas through solvation of the gaseous $CO_2$ within the liquid phase. Means that may be employed include concurrent contacting means, i.e. contact between unidirectionally flowing gaseous and liquid phase streams, countercurrent means, i.e. contact between oppositely flowing gaseous and liquid phase streams, and the like. Thus, contact may be accomplished through use of fluidic Venturi reactor, spray, tray, or packed column reactors, and the like, as may be convenient.

Generally, contact between the multicomponent gaseous stream and the aqueous fluid is carried out in a hydrate or clathrate formation reactor. The reactor may be fabricated from a variety of materials, where particular materials of interest are those which catalyze the formation of $CO_2$ clathrates or hydrates and include: stainless steel, carbon steel, and the like. The reactor surface, or a portion thereof, may be coated with a catalyst material, such as an oxide of aluminum, iron, chromium, titanium, and the like, to accelerate $CO_2$ hydrate formation. To ensure that the optimal temperature is maintained in the hydrate formation reactor, active coolant means may be employed. Any convenient coolant means may be used, where the coolant means will typically comprise a coolant medium housed in a container which contacts the reactor, preferably with a large surface area of contact, such as coils around or within the reactor or at least a portion thereof, such as the exit plenum and tail tube of the reactor. Coolant materials or media of interest include ammonia, HCFCs and the like, where a particular coolant material of interest is ammonia, where the ammonia is maintained at a temperature of from about −10 to −5° C. Where the reactor comprises gas injectors as the means for achieving contact to produce clathrates, the reactor may comprise 1 or a plurality of such injectors. In such reactors, the number of injectors will range from 1 to about 20 or more, where multiple injectors provide for greater throughput and thus greater clathrate production. Specific examples of various reactors that may be employed for clathrate production are provided in U.S. Application Ser. No. 09/067,937, the disclosure of which is herein incorporated by reference.

The clathrate formation conditions under which the gaseous and liquid phase streams are contacted, particularly the temperature and pressure, may vary but will preferably be selected so as to provide for the selective formation of $CO_2$ clathrates, limiting the clathrate formation of other components of the multi-component gaseous stream. Generally, the temperature at which the gaseous and liquid phases are contacted will range from about −1.5 to 10° C., usually from about −0 to 5° C., more usually from about 0.5 to 3.0° C. The total pressure of the environment in which contact occurs, e.g. in the reactor in which contact occurs, may range from about 3 to 200 atm, usually from about 10 to 100 atm. The $CO_2$ partial pressure at which contact occurs generally does not exceed about 80 atm, and usually does not exceed bout 40 atm. The minimum $CO_2$ partial pressure at which hydrates form in the presence of $CO_2$ hydrate promoters is generally less than about 9 atm, usually less than about 5 atm and may be as low or 2 or 1 atm or lower.

Upon contact of the gaseous stream with the aqueous fluid, $CO_2$ is selectively removed from the gaseous stream and $CO_2$ hydrates are formed as the $CO_2$ reacts with the $CO_2$ nucleated water liquid phase containing $CO_2$ hydrate precursors, with or without $CO_2$ hydrate promoters. The removed $CO_2$ is concomitantly fixed as solid $CO_2$ clathrates in the liquid phase slurry. Contact between the gaseous and liquid phases results in the production of a $CO_2$ depleted multicomponent gaseous stream and a slurry of $CO_2$ clathrates. In the $CO_2$ depleted multicomponent gaseous stream, the $CO_2$ concentration is reduced by at least about 50%, usually by at least about 70%, and more usually by at least about 90%, as compared to the untreated multicomponent gaseous stream. In other words, contact of the multicomponent gaseous stream with the $CO_2$ nucleated water results in at least a decrease in the concentration of the $CO_2$ of the gaseous phase, where the decrease will be at least about 50%, usually at least about 70%, more usually at least about 90%. In some instances the concentration of $CO_2$ in the gaseous phase may be reduced to the level where it does not exceed 5% (v/v), such that the treated gaseous stream is effectively free of $CO_2$ solute gas. As such, many embodiments of the subject methods provide for a "single-pass" efficiency of $CO_2$ removal of at least about 50%, and often at least about 75 or 90% or higher.

As discussed above, the $CO_2$ removed from the multi-component gaseous stream is concomitantly fixed in the form of stable $CO_2$ clathrates. Fixation of the $CO_2$ in the form of stable $CO_2$ clathrates results in the conversion of the aqueous fluid to a slurry of $CO_2$ clathrates. The slurry of $CO_2$ clathrates produced upon contact of the gaseous stream with the aqueous fluid comprises $CO_2$ stably fixed in the form of $CO_2$ clathrates and water. Typical mole fractions of $CO_2$ in stable clathrates are 0.12 to 0.15.

In cases where $CO_2$ hydrate liquid promoters are employed, either dissolved organic liquids or salts, as discussed previously, the $CO_2$ mole fraction may be lower, in the range of 0.05 to 0.12. These lower mole fractions may be employed, particularly if a two (2) stage hydrate reactor process is utilized., wherein the concentration of hydrate promoters may be varied between the two (2) stages to enhance low $CO_2$ partial pressure hydrate formation, particularly in the second stage. In these cases mixed hydrates of $CO_2$ and the promoter liquid or salt will form and permit lower $CO_2$ partial pressures, as low as 1 atm or less, to form hydrates; thus increasing overall $CO_2$ separation ratios from the multicomponent gaseous stream.

Methods of the subject invention generally also include the separation of the treated gaseous phase from the $CO_2$ clathrate slurry. As convenient, the gaseous phase may be separated from the slurry in the reactor or in a downstream gas-liquid separator. Any convenient gas-liquid phase separation means may be employed, where a number of such means are known in the art. In many preferred embodiments, the gas-liquid separator that is employed is a horizontal separator with one or more, usually a plurality of, gas off takes on the top of the separator. The subject invention provides for extremely high recovery rates of the multicomponent gaseous stream. In other words, the amount of non-$CO_2$ gases removed from the multicomponent gaseous stream following selective $CO_2$ extraction according to the subject invention are extremely low. For example, where the multicomponent gaseous stream is a shifted synthesis gas stream, the amount of combustible gases (i.e. $H_2$, $CH_4$ and CO) recovered is above 99%, usually above 99.2% and more usually above 99.5%, where the amount recovered ranges in many embodiments from about 99.6 to 99.8%.

Where it is desired to sequester the $CO_2$ clathrates produced by the subject method, the resultant $CO_2$ clathrate slurry may be disposed of directly as is known in the art, e.g. through placement in gas wells, the deep ocean or freshwater aquifers, and the like, or subsequently processed to separate the clathrates from the remaining nucleated water, where the isolated clathrates may then be disposed of according to methods known in the art and the remaining nucleated water recycled for further use as a selective $CO_2$ absorbent in the subject methods, and the like.

Where desired, $CO_2$ gas can easily be regenerated from the clathrates, e.g. where high pressure $CO_2$ is to be a product or further processed for sequestration, using known methods. The resultant $CO_2$ gas may be disposed of by transport to the deep ocean or ground aquifers, or used in a variety of processes, e.g. enhanced oil recovery, coal bed methane recovery, or further processed to form metal carbonates, e.g. $MgCO_3$, for fixation and sequestration.

In certain embodiments, the $CO_2$ hydrate slurry is treated in a manner sufficient to decompose the hydrate slurry into $CO_2$ gas and $CO_2$ nucleated water, i.e. it is subjected to a decomposition step. Typically, the $CO_2$ hydrate slurry is thermally treated, e.g. flashed, where by thermally treated is meant that temperature of the $CO_2$ hydrate slurry is raised in sufficient magnitude to decompose the hydrates and produce $CO_2$ gas. Typically, the temperature of the $CO_2$ hydrate slurry is raised to a temperature of between about 40 to 50° F., at a pressure ranging from about 3–20 to 200 atm, usually from about 40 to 100 atm. One convenient means of thermally treating the $CO_2$ hydrate slurry is in a counterflow heat exchanger, where the heat exchanger comprises a heating medium in a containment means that provides for optimal surface area contact with the clathrate slurry. Any convenient heating medium may be employed, where specific heating media of interest include: ammonia, HCFC's and the like, with ammonia vapor at a temperature ranging from 20 to 40° C. being of particular interest. Preferably, the ammonia vapor is that vapor produced in cooling the nucleation and/or hydrate formation reactors, as described in greater detail in terms of the figures.

A variety of multicomponent gaseous streams are amenable to treatment according to the subject methods. Multicomponent gaseous streams that may be treated according to the subject invention will comprise at least two different gaseous components and may comprise five or more different gaseous components, where at least one of the gaseous components will be $CO_2$, where the other component or components may be one or more of $N_2$, $O_2$, $H_2O$, $CH_4$, $H_2$, CO and the like, as well as one or more trace gases, e.g. $H_2S$, $SO_2$, etc. The total pressure of the gas will generally be at least about 15 atm, usually at least about 20 atm and more usually at least about 40 atm. The mole fraction of $CO_2$ in the multicomponent gaseous streams amenable to treatment according to the subject invention will typically range from about 0.10 to 0.90, usually from about 0.15 to 0.70, more usually from about 0.30 to 0.60 atm. The partial pressure of $CO_2$ in the multicomponent gaseous stream need not be high, and may be as low as 5 atm or lower, e.g. 2 or 1 atm or lower. By controlling the clathrate formation conditions, the $CO_2$ hydrate formation precursors and promoters, nucleated water properties, and providing intimate contact between the $CO_2$ nucleated water and the multicomponent gas, the $CO_2$ separation can be controlled to provide for the selective formation of $CO_2$ clathrates, e.g. through use of highly nucleated water containing hydrate precursors and promoters, and perhaps dissolved or dispersed catalysts, which further aids the selective $CO_2$ hydrate formation from the multicomponent gaseous stream and increases $CO_2$ separation efficiency. The particular conditions which provide for the best selectivity with a particular gas can be determined empirically by those of skill in the art. Multicomponent gaseous streams (containing $CO_2$) that may be treated according to the subject methods include both reducing, e.g. syngas, shifted syngas, natural gas, and hydrogen and the like, and oxidizing condition streams, e.g. flue gases from combustion. Particular multicomponent gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Multicomponent gaseous mediums in which the partial pressures of each of the components are suitable for selective $CO_2$ hydrate formation according to the subject invention may be treated directly without any pretreatment or processing. For those multicomponent gaseous mediums that are not readily suitable for treatment by the subject invention, e.g. in which the partial pressure of $CO_2$ is too low and/or the partial pressure of the other components are too high, may be subjected to a pretreatment or preprocessing step in order to modulate the characteristics of the gaseous medium so that is suitable for treatment by the subject method. Illustrative pretreatment or preprocessing steps include: temperature modulation, e.g. heating or cooling, decompression, compression, incorporation of additional components, e.g. $H_2S$ and other hydrate promoter gases, and the like.

The subject methods and systems provide for a number of advantages. First, the subject methods provide for extremely high $CO_2$ removal rates and separation ratios from the multicomponent gaseous stream. In many embodiments, the $CO_2$ separation ratio exceeds about 75%. In yet other embodiments, the $CO_2$ removal rate may exceed about 90% or even 95% in many embodiments. These exceptional recovery rates are observed at low $CO_2$ partial pressures, e.g. partial pressures that are less than about 5 atm in many embodiments as low as 1 to 2 atm or lower.

Although the above discussion has focused on the reduction of minimum $CO_2$ hydrate formation pressure by utilizing gaseous and/or liquid hydrate promoters, the above described approach can be utilized to reduce the minimum hydrate formation pressure of many hydrate forming gases, including methane, ethane, propane, butane, or mixtures of these gases, including natural gas, to separate or fractionate specific gaseous species utilizing hydrate formation as the thermodynamic foundation of the separation and/or hydrate formation process.

It is evident from the above discussion that a simple and efficient method for the selective removal of $CO_2$ from a multicomponent gaseous stream is provided. By using a $CO_2$ hydrate promoter in the multicomponent gaseous stream, one can obtain high single-pass $CO_2$ separation ratios at low $CO_2$ partial pressures, even at temperatures ranging from 0 to 1° C. As such, the subject invention represents a significant contribution to the art.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for removing $CO_2$ from a multicomponent gaseous stream to produce a $CO_2$ depleted gaseous stream, said method comprising:
    (a) providing a multicomponent gaseous stream;
    (b) contacting said multicomponent gaseous stream with an aqueous fluid under conditions sufficient to produce $CO_2$ hydrates, whereby $CO_2$ is removed from said gaseous stream by said aqueous fluid and concomitantly fixed as $CO_2$ clathrates upon said contacting to produce a $CO_2$ depleted gaseous stream and a $CO_2$ clathrate slurry; and
    (c) separating said $CO_2$ depleted gaseous stream from said $CO_2$ clathrate slurry;
    with the proviso that said method further comprises reducing the $CO_2$ partial pressure requirement of hydrate formation as compared to a control by providing a sufficient amount of a $CO_2$ hydrate promoter in at least one of said multicomponent gaseous stream and said aqueous fluid;
    whereby $CO_2$ is removed from a multicomponent gaseous stream.

2. The method according to claim 1, wherein said conditions sufficient to produce $CO_2$ hydrates comprise a temperature of about −1.5 to 10° C.

3. The method according to claim 1, wherein said aqueous fluid is $CO_2$ nucleated water.

4. The method according to claim 1, wherein a $CO_2$ hydrate promoter is present in both said multicomponent gaseous stream and said aqueous fluid.

5. A method for removing $CO_2$ from a multicomponent gaseous stream to produce a $CO_2$ depleted gaseous stream, said method comprising:
    (a) providing a multicomponent gaseous stream;
    (b) contacting said multicomponent gaseous stream with $CO_2$ nucleated water under conditions sufficient to produce $CO_2$ hydrates, whereby $CO_2$ is removed from said gaseous stream and concomitantly fixed as $CO_2$ clathrates upon said contacting to produce a $CO_2$ depleted gaseous stream and a $CO_2$ clathrate slurry; and
    (c) separating said $CO_2$ depleted gaseous stream from said $CO_2$ clathrate slurry;
    with the proviso that said method further comprises reducing the $CO_2$ partial pressure requirement of hydrate formation as compared to a control by providing a sufficient amount of a $CO_2$ hydrate promoter in at least one of said gaseous stream and said nucleated water, wherein said $CO_2$ hydrate promoter is present in an amount sufficient to reduce the $CO_2$ partial pressure requirement of hydrate formation at 0° C. as compared to a control;
    whereby $CO_2$ is removed from a multicomponent gaseous stream.

6. The method according to claim 5, wherein said $CO_2$ partial pressure requirement of hydrate formation in the presence of said $CO_2$ hydrate promoter does not exceed about 9 atm.

7. The method according to claim 5, wherein said $CO_2$ hydrate promoter is a low molecular weight compound not exceeding about 350 daltons.

8. The method according to claim 7, wherein said low molecular weight compound is a halogenated hydrocarbon.

9. The method according to claim 7, wherein said low molecular weight compound is a sulfur containing compound.

10. The method according to claim 7, wherein said low molecular weight compound is an organic salt.

11. The method according to claim 5, wherein said contacting occurs at a temperature ranging from about 0.5 to 3° C.

12. The method according to claim 5, wherein said contacting occurs at a system pressure ranging from about 3 to 200 atm.

13. A method for removing $CO_2$ from a multicomponent gaseous stream to produce a $CO_2$ depleted gaseous stream, said method comprising:
    (a) providing a multicomponent gaseous stream comprising a gaseous $CO_2$ hydrate promoter that reduces the $CO_2$ partial pressure requirement of hydrate formation as compared to a control, wherein said gaseous $CO_2$ hydrate promoter is a compound that has a vapor pressure ranging from about 0.1 to 1 atm at its hydrate formation temperature, wherein said $CO_2$ hydrate promoter is present in an amount sufficient to provide for $CO_2$ hydrate formation at a $CO_2$ partial pressure of less than about 9 atm at about 0° C.;
    (b) contacting said multicomponent gaseous stream with $CO_2$ nucleated water under conditions sufficient to produce $CO_2$ hydrates, whereby $CO_2$ is removed from said gaseous stream and concomitantly fixed as $CO_2$ clathrates upon said contacting to produce a $CO_2$ depleted gaseous stream and a $CO_2$ clathrate slurry, wherein said $CO_2$ nucleated water optionally contains a $CO_2$ hydrate promoter; and
    (c) separating said $CO_2$ depleted gaseous stream from said $CO_2$ clathrate slurry;
    whereby $CO_2$ is removed from a multicomponent gaseous stream.

14. The method according to claim 13, wherein said $CO_2$ hydrate promoter in said multicomponent gaseous stream is a low molecular weight compound not exceeding about 350 daltons.

15. The method according to claim 14, wherein said low molecular weight compound is a sulfur containing compound.

16. The method according to claim 15, wherein said sulfur containing compound is selected from the group consisting of $H_2S$, $SO_2$ and $CS_2$.

17. The method according to claim 15 wherein said contacting occurs at a temperature ranging from about 0.5 to 3° C.

18. The method according to claim 13, wherein said contacting occurs at a system pressure ranging from about 3 to 200 atm.

19. The method according to claim 13, wherein said method has a single-pass $CO_2$ separation ratio of at least about 50%.

* * * * *

UNITED STATES PATENT AND TRADEMARK OFFICE
CERTIFICATE OF CORRECTION

PATENT NO.     : 6,352,576 B1                                    Page 1 of 1
DATED          : March 5, 2002
INVENTOR(S)    : Dwain F. Spencer and Robert P. Currier It is certified that error appears in the above-identified patent and that said Letters Patent is hereby corrected as shown below:

<u>Column 1,</u>
Please add the following statement, prior to "Field of Invention":

-- STATEMENT REGARDING FEDERAL RIGHTS
This invention was made with government support under Contract No. W-7405-ENG-36 awarded by the U.S. Department of Energy. The government has certain rights in the invention. --

Signed and Sealed this

Twenty-fourth Day of June, 2003

JAMES E. ROGAN
*Director of the United States Patent and Trademark Office*